March 16, 1926.                                         1,577,062
                    T. DIXON
        COMBINED SHOCK ABSORBER AND SNUBBER
                 Filed April 29, 1925

INVENTOR.
Thomas Dixon
BY Jas. H. Griffin
ATTORNEYS.

Patented Mar. 16, 1926.

1,577,062

UNITED STATES PATENT OFFICE.

THOMAS DIXON, OF WEST NEW YORK, NEW JERSEY.

COMBINED SHOCK ABSORBER AND SNUBBER.

Application filed April 29, 1925. Serial No. 26,599.

*To all whom it may concern:*

Be it known that I, THOMAS DIXON, a citizen of the United States, residing at West New York, county of Hudson, and State of New Jersey, have invented a certain new and useful Combined Shock Absorber and Snubber, of which the following is a specification.

This invention is an automobile accessory and the object of the invention is to provide a device adapted for attachment to automobiles and capable of conjointly serving as both a shock absorber and a snubber. Both shock absorbers and snubbers are well known in the automobile art, but the present invention aims to provide a unitary structure for carrying out both functions in a simple, economical and efficient manner.

Speaking generally, the invention consists in a coiled spring, one end of which is adapted to be secured to the axle of the vehicle and the other end of which is adapted to be secured directly to the chassis frame. The spring is of the double action type, i. e. it is capable of operating under compression or expansion.

In the preferred form of the invention, it is so associated with the operative parts of the car that it will be slightly unwound or expanded when the associated wheel of the vehicle strikes an obstruction and will thus function as a shock absorber. On the rebound of the vehicle spring following the striking of the obstruction, the tendency of the chassis frame to lift will cause a compressing or winding up of the spring which will, in this instance, function as a snubber, and thus preclude breaking of the vehicle springs as so commonly results from rebound.

In practice four devices embodying the invention are preferably associated with the car when fully equipped therewith and will safeguard both the front and rear vehicle springs and render the car very easy riding. If desired, however, either the front axle or rear axle may be individually equipped and the other left unequipped.

An important feature of the present invention resides in the simplicity of the construction, the economy in manufacture, and ease in assembly.

Features of the invention, other than those specified, will be apparent from the hereinafter detailed description and claims, when read in conjunction with the accompanying drawings.

The accompanying drawings illustrate one practical embodiment of the invention, but the construction therein shown is to be understood as illustrative, only, and not as defining the limits of the invention.

Figure 1:
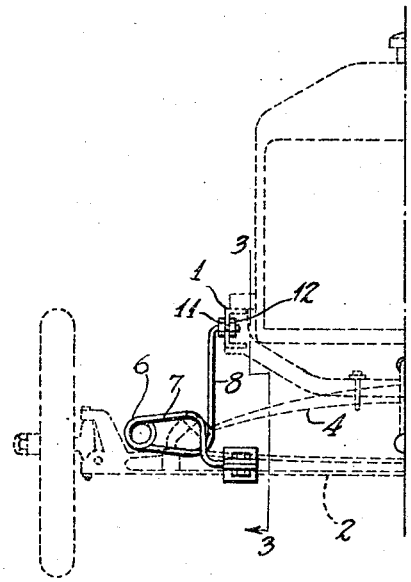
Figure 1 shows in front elevation one lateral half of a motor vehicle with the present invention associated therewith.
Figure 2:
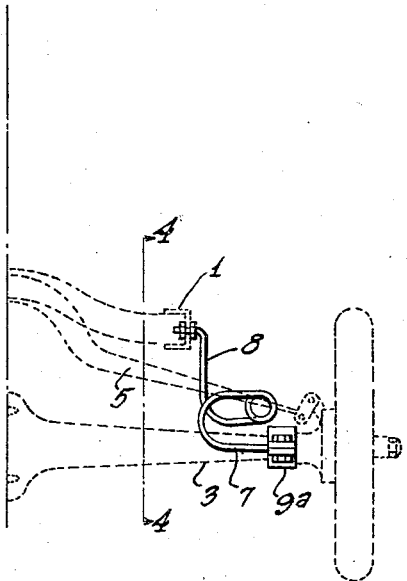
Figure 2 is a similar view looking from the rear of the vehicle.

In Figures 1 and 2 I have shown in dotted lines conventional motor car construction embodying, generally speaking, a chassis frame 1 with which is associated a front axle 2 and a rear axle housing 3. With the front axle cooperates the conventional forward spring 4, while the usual spring 5 cooperates with the rear axle. The springs 4 and 5 form a part of a stop car and serve to support the chassis frame above the axle in the well known manner forming no part of this invention.

Figure 3:
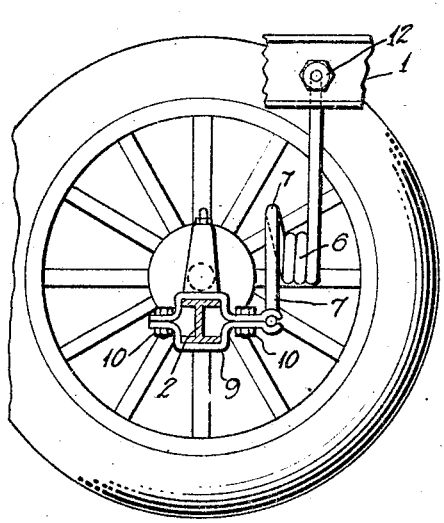
Figure 3 is a section on the line 3—3 of Figure 1.
Figure 4:
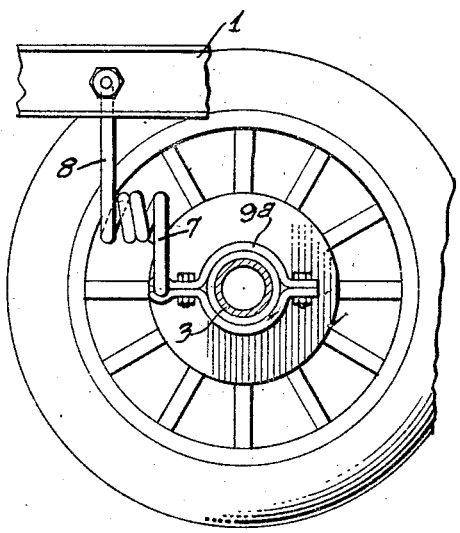
Figure 4 is a section on the line 4—4 of Figure 2.

In the preferred form of the invention, my shock absorber and snubber when associated with the front axle is in the form shown in Figures 1 and 3. It embodies a coil spring 6 having a plurality of convolutions and the opposite ends of which spring are bent to form arms 7 and 8, the former of which is adapted to be secured to the front axle and the latter to the chassis frame. The means for securing the arms 7 and 8 to the respective parts may of course vary without departing from the invention, but, for illustrative purposes, I have shown the arm 7 as attached to a bracket 9. This bracket is formed in two parts adapted to simultaneously embrace both the axle and the end of the arm 7 and when these parts are secured together by bolts 10, they serve to tightly clamp the bracket to the axle and the bracket to the arm 7. The end of the arm 8 may be secured to the chassis frame in any convenient manner, but for the purpose of illustration, the end of said arm is shown as threaded and is adapted to be passed through a hole bored in the chassis frame and the arm clamped to the frame by means of jamb nuts 11 and 12. When thus mounted in position, the ends of the arms 7 and 8 will be respectively secured to the axis of the chassis frame.

A like arrangement may be employed in conjunction with the rear axle although I preferably form the arm 7 as shown in Figure 2 for rear axle installation, and mount the bracket on the front axle as close to the hub of the wheel as possible. This bracket which is designated 9ª is practically the same construction as the bracket 9, but is of course shaped to properly cooperate with the rear axle housing and accordingly the parts or sections of said bracket are substantially semicircular in shape. The arm 8 of the structure as shown in Figure 2 is formed in the same manner as described with reference to front axle assembly and is secured to the chassis frame in the same way.

In practice, I preferably so form the device of this invention that it will be normally under slight expanding force when in place on the car and the car at rest. Thus in applying the devices to a car, the frame of the car is jacked up sufficiently to permit the devices to be attached while in neutral condition. When the jack or jacks are removed, the weight of the car will be partially imposed upon the shock absorbing devices and will be carried by these devices and by the front and rear springs 4 and 5, so that when the car strikes an obstruction or irregularity in the road, the shock absorbing devices will be further flexed and will cooperate with the vehicle springs to cushion the chassis frame against resulting shock. On the rebound following the shock, there will be a tendency of the chassis frame to lift, but after it has lifted a relatively small distance, the neutral point of the shock absorbing devices will be passed and further tendency of the chassis frame to lift will place said devices under compression. That is to say, such lifting tendency will wind up the springs 6 so that the lifting tendency will be counteracted or counterbalanced by the tension imparted to the springs 6 by such lifting action and the devices will thus function as snubbers. If desired, the devices may be so installed that when the vehicle is at rest or passing over a perfectly smooth pavement, said devices will be in neutral condition, but I find in practice that the best results are obtained if they are so proportioned as to normally be under slight tension.

The combined snubber and shock absorber of this invention may be made from a bar of metal bent into the desired shape and heat treated to render it resilient and capable of carrying out its functions as a spring element and such being the case, it may be manufactured very economically and without the use of complicated machinery or tools. In practice, the device is highly efficient both as a shock absorber for assisting the springs in cushioning the chassis against sudden shocks and as a snubber or check against recoil following such shocks. The device may be installed by the car owner or other persons who are not possessed of any particular skill in the handling of tools and may be applied without necessitating any change in the car construction other than the boring of one hole in the chassis frame for each device. The structural elements of the car remain the same and are unchanged.

The accompanying drawings show the invention in its preferred practical forms, but inasmuch as it will be apparent that changes in shape which do not depart from the spirit of this invention may be made without departing from the invention which is to be understood as fully commensurate with the appended claim.

Having thus fully described the invention, what I claim as new and desire to secure by Letters Patent is:

A shock absorber and snubber embodying a coil spring having a series of coaxial helical convolutions, which terminate in a pair of integral attaching arms, a bracket carried by one of said arms and adapted to be secured to the axle of a vehicle, the other attaching arm having a threaded end adapted to pass through an aperture in the chassis frame of the vehicle, and a nut cooperating with the threaded portion of the latter arm for securing said arm to the chassis frame.

In testimony whereof I have signed the foregoing specification.

THOMAS DIXON.